(12) United States Patent
Kinnersley et al.

(10) Patent No.: US 10,846,712 B2
(45) Date of Patent: Nov. 24, 2020

(54) CULTURAL DETERMINATION ENGINE

(71) Applicant: FORTAY INC., Toronto (CA)

(72) Inventors: Marlina Stacey Kinnersley, Toronto (CA); Bohdan Konstantyn Zabawskyj, Toronto (CA)

(73) Assignee: FORTAY INC., Toronto (CA)

( * ) Notice: Subject to any disclaimer, the term of this patent is extended or adjusted under 35 U.S.C. 154(b) by 538 days.

(21) Appl. No.: 14/793,046

(22) Filed: Jul. 7, 2015

(65) Prior Publication Data

US 2017/0011295 A1    Jan. 12, 2017

(51) Int. Cl.
*G06N 5/04* (2006.01)
*G06Q 30/02* (2012.01)

(52) U.S. Cl.
CPC .......... *G06Q 30/0201* (2013.01); *G06N 5/04* (2013.01)

(58) Field of Classification Search
None
See application file for complete search history.

(56) References Cited

PUBLICATIONS

Ghosh, et al., Financial Time Series Forecasting using Agent Based Models in Equity and FX Markets, Computer Science and Electronic Engineering Conference (CEEC), 2014 Sep. 6, 2014, pp. 1-6.*
Ghosh, et al., Financial Time Series Forecasting using Agent Based Models in Equity and FX Markets, Computer Science and Electronic Engineering Conference (CEEC), 2014 Sep. 6, 2014, pp. 1-6 (Year: 2014).*
Figueiredo, Understanding, Modeling, and Predicting the Popularity of Online Content on Social Media Applications, Doctoral Thesis, Universidade Federal de Minas Gerais, 2015, pp. 1-202 (Year: 2015).*

* cited by examiner

*Primary Examiner* — Wilbert L Starks
(74) *Attorney, Agent, or Firm* — Perry + Currier

(57) ABSTRACT

A cultural determination engine is provided. The cultural determination engine is configured to assess a cultural profile by computing a distance between a received response to a query and a reference response.

14 Claims, 10 Drawing Sheets

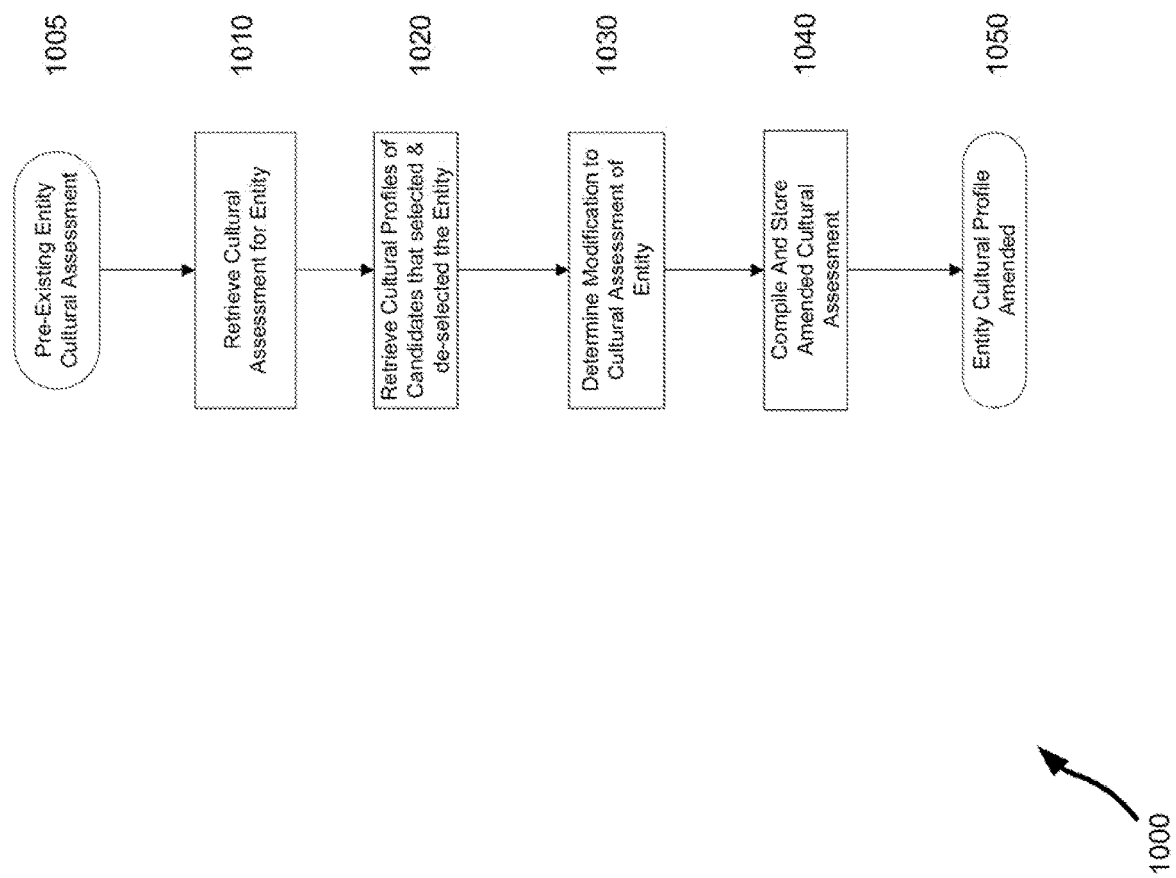

CULTURAL DETERMINATION ENGINE

FIELD

The present specification relates generally to computing devices and methods and systems, and more specifically relates to the use of computing devices and methods and systems for the purpose of determining a cultural assessment and relative cultural correlation.

BACKGROUND

Although numerous job listing and matching services exist, these applications and services have not effectively addressed issues with determining the relative cultural correlation between a given candidate and entity. In particular, the use of psychographic or personality profiling analysis as well as social data including the use of semantic analysis, sentiment analysis, or the use of social graphs that define networks of connections and relationships between individuals or entities has not demonstrated to have any material efficacy with respect to the cultural correlation between a given candidate and a given entity as generally indicated by engagement metrics including, but not limited to a decrease in employee churn.

SUMMARY

Although numerous job listing and matching services exist, these applications and services have not effectively addressed issues with determining the relative cultural correlation between a given candidate and entity. In particular, the use of psychographic or personality profiling analysis as well as social data including the use of semantic analysis, sentiment analysis, or the use of social graphs that define networks of connections and relationships between individuals or entities has not demonstrated to have any material efficacy with respect to the cultural correlation between a given candidate and a given entity as generally indicated by engagement metrics including, but not limited to a decrease in employee churn.

The invention provides methods and systems for the purpose of determining a cultural assessment for a candidate and relative cultural correlation between a given candidate and an entity. In accordance with an aspect of the disclosed invention, there is provided:
a. A method and system for determining the cultural profile of a candidate;
b. A method and system for assessing the cultural assessment of an entity;
c. A method and system for determining the cultural correlation between a candidate and an entity;
d. A method and system that amends the cultural profile of a candidate and the cultural assessment of an entity based on activity in connection with the use of the method and system;
e. A method and system whereby a candidate can select a given entity on the basis of the cultural correlation between the candidate and the entity;
f. A method and system whereby communication is enabled between a candidate and an entity on the basis of the cultural correlation between the candidate and the entity;
g. A method and system that allows importation of candidate and entity data from social network, human resource, or employment network systems or platforms.

BRIEF DESCRIPTION OF THE DRAWINGS

Reference will now be made, by way of example only, to the accompanying drawings in which:

FIG. 10 is a flow chart of a method in accordance with an embodiment of reassessing the cultural profile for an entity.

DETAILED DESCRIPTION OF THE EMBODIMENTS

Figure 1:
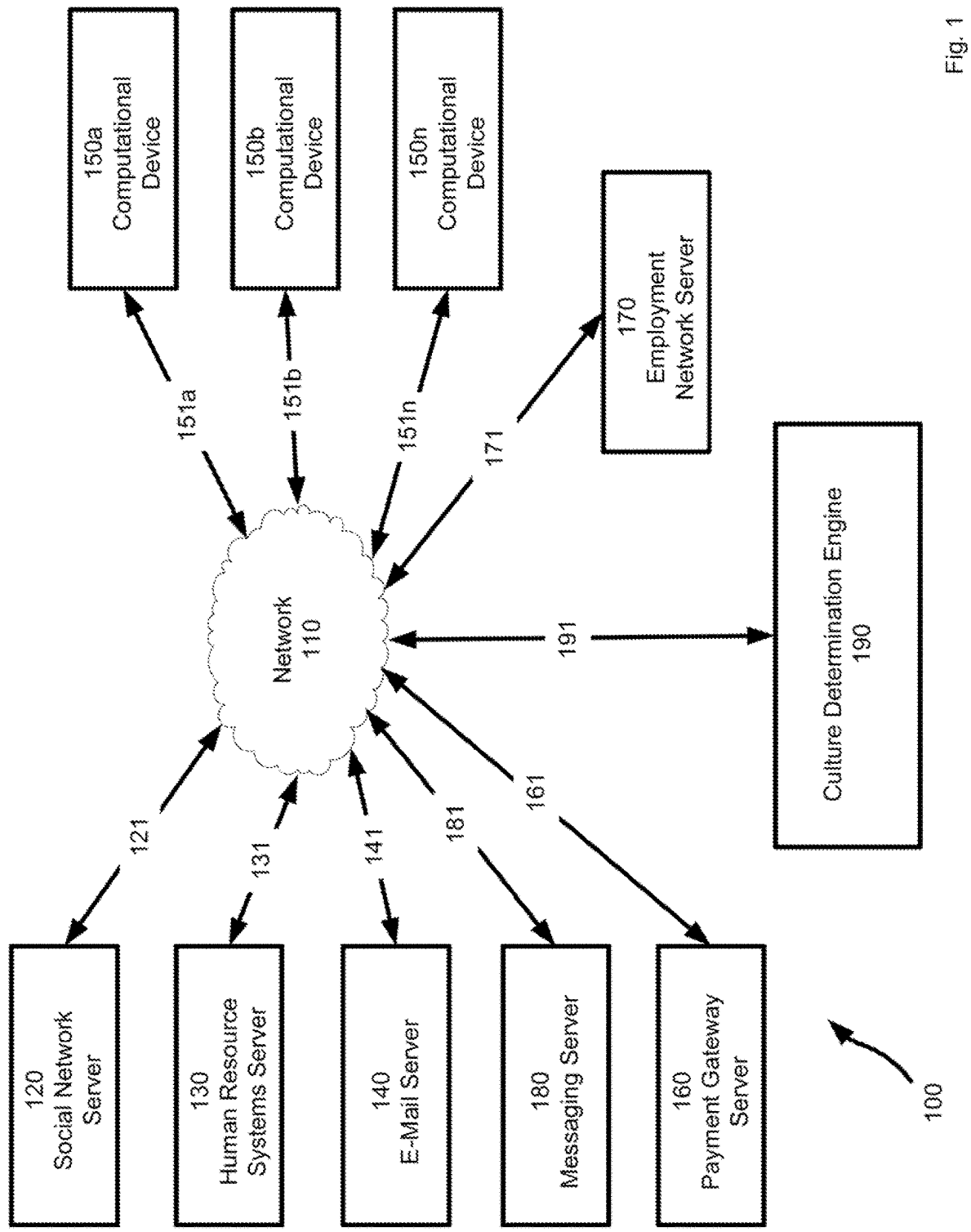
FIG. 1 is a schematic block diagram of the components of a system in accordance with an embodiment.

Referring to FIG. 1, System 100 includes a plurality of servers 120, 130, 140, 160, 170, 180 and so on (collectively referred to as servers and generically, as a server). Each server can be based on any known server environment. As such, each server includes one or more processors, volatile (e.g. Random Access Memory ("RAM")) and/or non-volatile (e.g. read only memory ("ROM"), Electrically Erasable Programmable Read Only Memory ("EEPROM"), flash memory, magnetic or solid state computer storage device, or optical disc) memories and one or more communications interfaces for interconnecting with network 110 via links 121, 131, 141, 161, 171, and 181 (collectively referred to as links and generically, as a link). Links can be, for example, wired or wireless links. Servers can be managed by way of input and output devices (not shown) such as keyboards and displays. Such input and output devices can be co-located with servers or can be located at terminals (not shown) remote from servers and connected to servers via network 110.

System 100 includes a plurality of computing devices 150a, 150b, 150n (collectively referred to as computing devices 150 and generically, as a computing device 150). Computing devices 150 connect via with network 110 via links 151a, 151b, 151n (collectively referred to as links and generically, as a link 151). Computing devices 150 can be a desktop computer, a laptop, a tablet computer, a smart phone, a personal digital assistant (PDA), a wearable computer, or any other suitable computing device.

Figure 2:
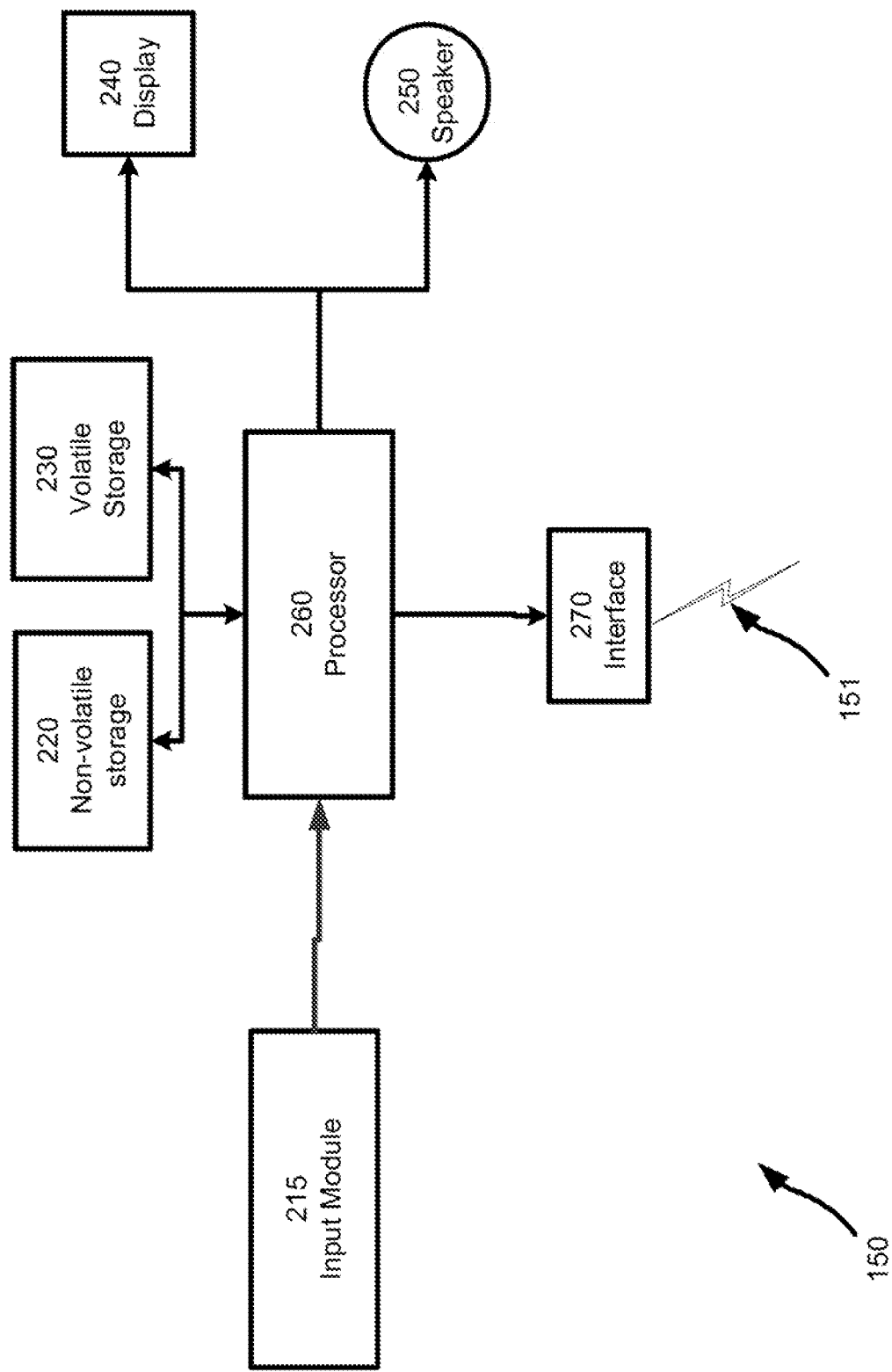
FIG. 2 is a schematic block diagram of the components of a computing device in accordance with the embodiment of FIG. 1.

Referring to FIG. 2, the computing device 150 includes a processor 260; input module 215 which may include a keyboard, a mouse, a touch screen, a camera, a microphone, a barcode scanner, and/or the like; output devices which may include a display 240 and/or speaker 250; and an interface module 270. The components and modules of computing device 150 may send signals to each other. For example, the processor 260 can send a signal to the display 240 to cause the display 240 to display a visual indicator. The processor 260 can be any suitable processing device configured to run and/or execute modules, functions, and/or processes associated with displaying a visual indicator. The processor 260 can be a general purpose processor, a Field Programmable Gate Array (FPGA), an Application Specific Integrated Circuit (ASIC), a Digital Signal Processor (DSP), and/or the like. In some embodiments, the computing device 150 can include one or more hardware-based modules (e.g., DSP, FPGA, ASIC) and/or software-based modules (e.g., a module of computer code to be executed at a processor, a set of processor-readable instructions that can be executed at a processor) associated with executing an application, such as, for example, a web browser application operable to display a visual indicator (not shown). The processor 260 can be configured to retrieve data from and/or write data into the volatile storage 230 and/or non-volatile storage 220 (collectively referred to as memory). The memory can be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, and/or so forth. In some embodiments, memory can store instructions operable to cause the processor 260 to execute modules, processes, and/or functions associated with displaying a visual indicator, for example, in a web browser application (not shown). The processor 260 can be configured to control operation of the interface module 270. The interface module 270 can be configured to operatively and/or communicatively couple the computing device 150 to the network 110 and/or to devices similarly connected to the network 110 via link 151. The interface module 270 can be software and/or hardware associated with, for example, a Network Interface Controller (NIC), a cellular telephone radio, and/or any other suitable network access hardware and/or software (executing in hardware). Link 151 is compatible with network 110. In some embodiments, link 151 is a wired link and in other embodiments it is a wireless link. It will be understood that interface module 270 can therefore be selected for compatibility with link 151 as well as with network 110.

Figure 3:
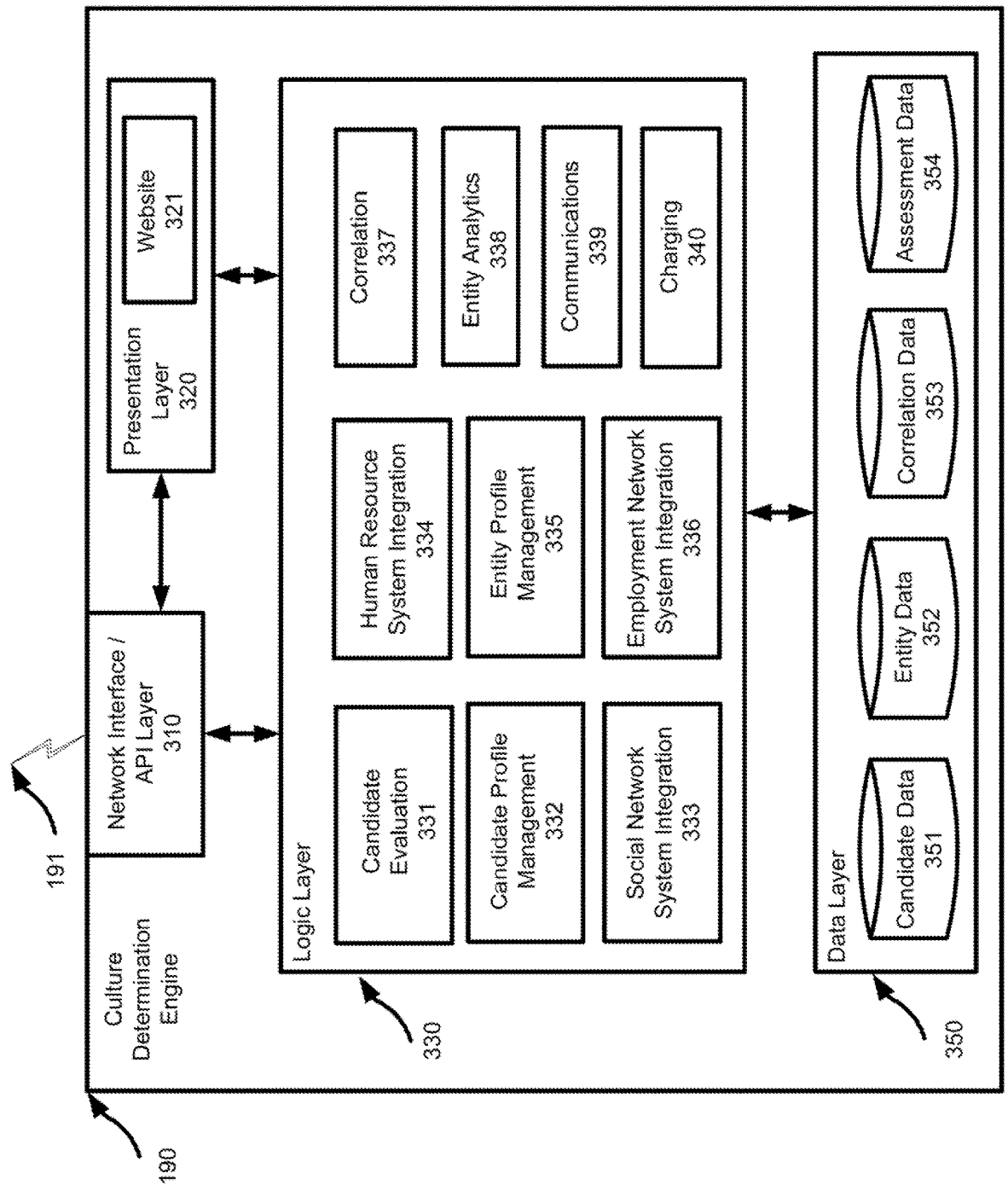
FIG. 3 is a schematic block diagram of the components of a cultural determination engine in accordance with the embodiment of FIG. 1.

Referring to FIGS. 1 and 3, in a non-limiting embodiment, an application resident on computing device 150 may interact with culture determination engine 190 for the purpose of facilitating entry or modification of data in connection with determining an appropriate entity with an appropriate cultural correlation. For example an application resident on computing device 150 may facilitate the entry of culture preference data via the candidate evaluation module 331 of cultural determination engine 190, the entry or modification of candidate profile data via the candidate profile management module 332 of cultural determination engine 190, the receipt or transfer of social network data via the social network system integration module of cultural determination engine 190. It will be evident to those skilled in the art that an application resident on computing device 150 may include a web browser application, a 'native' application, a 'web widget' which executes within a web-browser application, or some hybrid variant which includes aspects of web, native, or widget based technologies. In a non-limiting embodiment, any combination of web-browser applications, native applications, 'web widgets', or hybrid variants may be used to facilitate data entry, modification, or determination of cultural correlation between a candidate and a given entity. In one example non-limiting embodiment of a 'web widget', a web-widget may facilitate the entry of preferred entities as a given user browses various web-sites using a web-browser hosted on computing device 150. The 'web widget' would interact with candidate profile management module 332 of cultural determination engine 190 for the purpose of modifying preferred entity data.

It is to be noted that while the terms "user", "candidate", or "entity" is used frequently herein, it is to be understood that this represents a functional result of an underlying structure that is implied by the terms "user", "candidate", or "entity". Such an underlying structure can comprise accounts maintained within cultural determination engine 190, and such accounts themselves include user identification and other profile information. Non-limiting examples of such will be discussed in greater detail below. In turn, such accounts can be accessed through different computing devices 150 by supplying appropriate credentials which are then authenticated at cultural determination engine 190. Accordingly, the person skilled in the art is advised to read the term "user", "candidate", or "entity" so as to suggest an underlying technological structure, either according to the example given, or according to another technological construct within the scope of that skilled person, and which implements the notional concept of a "user", "candidate", or "entity" as that term is used herein.

Referring to FIG. 2, The processor 260 can further be configured to process interactions from the user (not shown) via the input module 215, which can be a keyboard, a mouse, a touch screen, a camera, a microphone, a barcode scanner, and/or the like. Thus, the user can direct the computing device 150 to perform specific functions via the input module 215. The processor 260 can further be configured to provide an output via the display 240. The display 240 can be any type of module for displaying information, for example, a liquid crystal display (LCD) monitor, a cathode ray tube (CRT) monitor, and/or the like. In some embodiments, the processor 260 can be configured to display content using an application, for example, a web browser. For example, the computing device 150 can be a computer operable to connect to the Internet.

The network 110 can be any type of network that can be accessed by interface modules (e.g., the interface module 270) directly or indirectly (i.e., via another network such as a cellular network or a Wi-Fi network). The network 110 can be implemented as a wired network and/or a wireless network. The network 110 can be, for example, a local area network (LAN), a wide area network (WAN), an intranet, a telecommunications network, the Internet, etc.

Referring to FIG. 1, as will be discussed in greater detail below, each server can be a remote source of data and/or provide supplementary functionality to culture determination engine 190. For example, Social Network Server 120 can be a server hosting a social networking application such as LINKEDIN, TWITTER, PINTEREST, or FACEBOOK. Those skilled in the art will recognize that the noted social networking sites are merely indicative of a growing number of social network sites (many of which are segmented by interest and location). Data or services hosted on Social Network Server 120 can be an optional source of candidate or entity data as well as provide a means for authenticating the identity of a candidate or entity for cultural determination engine 190. Human Resource Systems Server 130 can be a server hosting one or more human resources functions including benefits administration, payroll, training, applicant tracking, vacation tracking, or performance evaluation/analysis. Examples of contemporary human resource systems providers include HALOGEN TALENTSPACE, PEOPLESOFT, SUCCESSFACTORS, BAMBOOHR, and TRIBEHR. Other services and functions provided by Human Resource System Server 130 may encompass: payroll systems, time and attendance tracking systems, performance appraisal systems, benefits administration systems, human resource management information systems, recruiting/learning management systems, performance record systems, employee self-service systems, scheduling systems, absence management systems, and analytics systems. Data including candidate profiles or entity information as well as services hosted on Human Resource Systems Server 130 can be an optional source of candidate or entity data as well as provide a means for authenticating the identity of a candidate or entity for cultural determination engine 190. E-Mail Server 140 can be a server hosting webmail services such as GMAIL, or YAHOO! MAIL or HOTMAIL as well as server based mail services such as MICROSOFT OUTLOOK or BLACKBERRY which allow cultural determination engine 190 to communicate to computing device 150 via e-mail accounts. Messaging Server 180 can include messaging or communication services including instant messaging services such as WINDOWS LIVE MESSENGER, YAHOO! MESSENGER or GOOGLE TALK—as well as communication services such as SKYPE or GOOGLE VOICE. Payment Gateway Server 160 can be a server providing authorization and payment processing services to accommodate credit card, INTERACT, automated clearing house (ACH), and other debit/direct payment transactions. Example payment gateway providers include PAYPAL, AUTHORIZE.NET, PSIGATE, ITRANSACT, 2CHECKOUT, VERSAPAY, GOOGLE CHECKOUT. Those skilled in the art will recognize e-commerce payments can be facilitated by accessing the Payment Gateway Sever 160 by using an API (Application Programming Interface) or by redirecting a transaction to the website hosted by Payment Gateway Server 160. In the latter case, after the payment is processed, the transaction is returned or redirected back to the culture determination engine 190. Payment gateways protect credit card details by encrypting sensitive information, such as credit card numbers, to ensure that information is passed securely between the customer and the merchant and also between merchant and the payment processor. Employment Network Server 170 can be a server hosting job listing, job classified, or entity rating/evaluation services such as MONSTER, INDEED, JOBSTORE, GLASSDOOR, LINKEDIN, or MAGNET. Data including listing of jobs, candidate profiles, or entity information as well as services hosted on Employment Network Server 170 can be an optional source of candidate or entity data as well as provide a means for authenticating the identity of a candidate or entity for cultural determination engine 190. Those skilled in the art will recognize that the noted employment sites are merely indicative of a growing number of employment sites (many of which are segmented by domain and location). It will be evident to those skilled in the art that there may be overlap between the services provided by servers 120, 130, 140, 160, 170. For example, Social Network Server 120 may also provide messaging services, e-mail functionality, or job listing services associated with Messaging Server 180, E-Mail Server 140, and Employment Network Server 170 respectively.

Referring now to FIG. 3, a schematic block diagram of certain components of culture determination engine 190 is depicted. It will now be apparent that each element of culture determination engine 190 depicted in FIG. 3 and discussed below can be carried out by the processor (not shown) executing operations. For example, computer readable medium can be encoded with codes to direct the processor to carry out operations of the culture determination engine 190. In other words, functionality described below as being carried out by a certain module of culture determination engine 190 can be based on any known server environment. As such, each server including one or more processors, volatile (e.g. Random Access Memory ("RAM")) and/or non-volatile (e.g. read only memory ("ROM"), Electrically Erasable Programmable Read Only Memory ("EEPROM"), flash memory, magnetic or solid state computer storage device, or optical disc) memories and a network interface/API Layer 310 for interconnecting with network 110 via link 191.

Culture determination engine 190 includes a logic layer 330, data layer 350, network interface/API layer 310, and presentation layer 320. Network interface/API layer 310 enables interaction between the logic layer 330, data layer 350, presentation layer 320, and network 110. The individual layers of culture determination engine 190 are collectively referred as layers. That is, network interface/API layer 310 enables interaction between the layers and modules of culture determination engine 190 as well as applications and services hosted by servers accessible as well as computing devices 150 via network 110. Not all the linkages between the modules and layers of culture determination engine 190 are shown in FIG. 3. Presentation layer 320 can include various modules for interacting with applications and services hosted by servers or computing devices 150 accessible via network 110. For example, presentation layer 320 can include a website module 321 for enabling interactions with a browser application of computing device 150. Those skilled in the art will recognize that a number of protocols (e.g. HTTP, HTTPS, TCP/IP, SMTP etc.) and Application Programming Interfaces can be used independently or in combination to effect the transfer of data between the layers and modules of culture determination engine 190 and the applications and services hosted by servers or computing devices 150 accessible via network 110.

Logic layer 330 may include a candidate evaluation module 331, entity profile management module 335, correlation module 337, candidate profile management module 332, entity profile management module 335, human resource system integration module 334, social network integration module 333, employment network system integration module 336, entity analytics module 338, communications module 339, and charging module 340. The functions of the various exemplary modules of logic layer 330 will be discussed below in greater detail.

The candidate evaluation module 331 is generally configured to assess a candidate's cultural preferences using queries retrieved via assessment data module 354. Queries to the candidate can be formulated via a variety of methods including a gradient between two conceptual opposites (e.g. "Not at all" to "Always"), multiple choice questions, or a question where the candidate can provide a free-form response (e.g. by text or by voice). The sequence, number, and nature of the queries used by candidate evaluation module 331 can be modified based on a variety of factors including contextual factors (e.g. the candidate's location, the nature of the computational device used) as well as the candidate's preferences (e.g. preferred language, domains of interest). Queries and a candidate's responses are displayed and recorded via a computational device 150 accessed via network 110. Candidate evaluation module 331 is used by entity analytics module 338 for the purpose of assessing one or more candidates relative cultural fit with a given entity.

The candidate profile management module 332 is generally configured to maintain and manage the underlying structure for account data and profile information that collectively comprises an account for candidates of cultural determination engine 190. The data maintained by candidate profile management module 332 includes data specific to cultural determination engine 190 including, but not limited to, log-in credentials, profile information, preferred locations(s) of the candidate, leadership preferences, preferred entity information (e.g. desired size of the entity), domains of interest (preferred domains for a candidate of cultural determination engine 190 which may be used to facilitate matching by correlation module 337 (e.g. "education", "health", "finance", "marketing", "business development")), core values, work experience, on-line recommendations received, cultural preferences, statistical information (e.g. entities selected by the candidate, number of times the candidate has been selected by a given entity), other contextual data such as the current location and the nature of the computational device used by a candidate of cultural determination engine 190. The data maintained by candidate profile management module 332 also includes, but is not limited to, one or more account identifiers, log-in names or other credentials and information to access, send, or retrieve data from applications and services hosted by servers accessible via network 110. The candidate profile management module 332 can also acquire and manage data pertaining to any prescribed preferences or data associated with a candidate of culture determination engine 190 as well as preferences associated with other modules in the logic layer 330. For example, the candidate profile management module 332 can acquire and manage data pertaining to social network applications or sites, e-mail accounts, and messaging services including the applicable name, address information (e.g. internet addresses or URLs), and log-in information (e.g. identifier, password, and other credentials). Such account management data can also include any other prescribed information pertaining to how or when to access an information source (for example, whether to access an information source at a specified time or frequency). Candidate profile management module 332 can maintain the above-described account management data for each application and service hosted by servers accessible via network 110. The data maintained by candidate profile management module 332 may also include attributes associated with facilitating access (e.g. e-mail addresses, LINKEDIN identifiers, TWITTER identifiers etc.) to facilitate communication to users of cultural determination engine 190 via E-Mail Server 140, Employment Network Server 170, or Messaging Server 180 or to import social data including social graph information via one or more social network applications and services hosted by Social Network Server 120 accessible via network 110. Other social data may include interests, groups, recent posts, pictures, personal information (e.g. employment history, skills, recommendations, affiliations, birthdate, schools attended etc.), as well as any other information the user has elected to share. Data maintained by candidate profile management module 332 along with other notification-related configurable settings, can be accessed and managed from computing device 150 (e.g. via a web browser interface). Culture profile data used by culture determination engine 190 is maintained and accessed via candidate data module 351 of data layer 350.

The social network integration module 333 is generally configured to access services and applications hosted via Social Network Server 120 for the purpose of authenticating a candidate's or entity's identity and credentials with respect to a given social network application or service hosted via Social Network Server 120. The social network integration module 333 may also access services and applications hosted via Social Network Server 120 for the purpose of accessing and retrieving profile and candidate data including contact information, job titles, role data, skills, experience, accreditation, history of employment, and social graph data (e.g. friends, colleagues, group lists). Other social data associated with a candidate may also be retrieved including interests, recent posts, pictures, personal information (e.g. affiliations, birthdate, schools attended etc.), as well as any other information the candidate has elected to share. The social network integration module 333 may also access services and applications hosted via Social Network Server 120 for the purpose of accessing and retrieving entity data including contact information, job posts, location information, product and service information, benefits, and other items of potential interest to candidates. Data accessed and retrieved via the social network integration module 333 may optionally be used by the candidate profile management module 332 to update or augment a candidate's profile. Data accessed and retrieved via the social network integration module 333 may optionally be used by the entity profile management module 335 to update or augment an entity's profile. Social data accessed and retrieved via the social network integration module 333 may optionally be used by the candidate evaluation module 331 or correlation module 337 to highlight or suggest entities that are relevant to a candidate. The communication module 339 may optionally invoke the social network integration module 333 to post information pertinent to a candidate or entity of cultural determination engine 190 (e.g. an available job post or an attestation) within a given candidate's or entity's social networks as maintained by social network applications or services hosted via Social Network Server 120. In a non-limiting embodiment of social network integration module 333, data accessed and retrieved via the social network integration module may optionally be utilized to indicate social media linkages between the given candidate and employee's associated with a given entity.

The human resource system integration module 334 is generally configured to access services and applications hosted via Human Resource System Server 130 for the purpose of importing or exporting data associated with entities or employees associated with a given entity as well as provide an optional means for authenticating the identity of an entity for cultural determination engine 190. The human resource system integration module 334 may also access services and applications hosted via Human Resource System Server 130 for the purpose of accessing and retrieving entity data including contact information, job posts, location information, product and service information, benefits, and other items of potential interest to candidates. Data accessed and retrieved via the human resource system integration module 334 may optionally be used by the entity profile management module 335 to update or augment an entity's profile. Data accessed and retrieved via the human resource system integration module 334 may optionally be used by the candidate evaluation module 331 or correlation module 337 to highlight or suggest entities that are relevant to a candidate.

The entity profile management module 335 is generally configured to maintain and manage the underlying structure for account data and profile information that collectively comprises an account for entities of cultural determination engine 190. The data maintained by entity profile management module 335 includes data specific to cultural determination engine 190 including, but not limited to, log-in credentials, profile information, identities associated with candidates selected for the purpose of determining the entity's cultural profile, products and services associated with the entity, job descriptions, one or more locations associated with the entity, benefit information (e.g. health plans, subsidized meals, stock-option plans, training), environmental conditions (e.g. office topology, type of office furniture and equipment used), size of the entity, and other contextual data such as the current location and the nature of the computational device used by an authorized user associated with entity of cultural determination engine 190. The data maintained by entity profile management module 335 also includes, but is not limited to, one or more account identifiers, log-in names or other credentials and information to access, send, or retrieve data from applications and services hosted by servers accessible via network 110. The entity profile management module 335 can also acquire and manage data pertaining to any prescribed preferences or data associated with an entity of culture determination engine 190 as well as preferences associated with other modules in the logic layer 330. For example, the entity profile management module 335 can acquire and manage data pertaining to accounts and log-in information (e.g. identifier, password, and other credentials). Such account management data can also include any other prescribed information pertaining to how or when to access an information source (for example, whether to access an information source at a specified time or frequency). Entity profile management module 335 can maintain the above-described account management data for each application and service hosted by servers accessible via network 110. The data maintained by candidate profile management module 332 may also include attributes associated with facilitating access (e.g. log-in credentials) to facilitate communication with Human Resource Server 170 accessible via network 110 for the purpose of importing or exporting information required by cultural determination engine 190. The data maintained by candidate profile management module 332 may also include attributes associated with facilitating access (e.g. e-mail addresses, LINKEDIN™ identifiers etc.) to facilitate communication to users of cultural determination engine 190 via E-Mail Server 140, Employment Network Server 170, Messaging Server 180, or Social Network Server 120 accessible via network 110. Data maintained by entity profile management module 335 along with other notification-related configurable settings, can be accessed and managed from computing device 150 (e.g. via a web browser interface). An entity's data used by culture determination engine 190 is maintained and accessed via entity data module 352 of data layer 350. In non-limiting embodiments, the entity profile management module 335 can utilize one more attributes such as location, hiring manager identity attributes, departmental information (e.g. marketing, finance, or engineering) to partition entity information or otherwise support virtual entities for the purpose of determining a given cultural profile. The creation of virtual entities would facilitate the creation of distinct cultural profiles associated with different departments or locations within a given entity (e.g. the engineering department versus the marketing department for a given entity.

The employment network system integration module 336 is generally configured to access services and applications hosted via Employment Network Server 170 for the purpose of importing or exporting data associated with candidates or entities as well as provide an optional means for authenticating the identity of a candidate or entity for cultural determination engine 190. The employment network system integration module 336 may also access services and applications hosted via Employment Network Server 170 for the purpose of accessing and retrieving jobs listing data, candidate profiles, or entity information, and items of potential interest to candidates. Data accessed and retrieved via the employment network system integration module 336 may optionally be used by the entity profile management module 335 to update or augment an entity's profile. Data accessed and retrieved via the employment network system integration module 336 may optionally be used by the candidate evaluation module 331 or correlation module 337 to highlight or suggest entities that are relevant to a candidate.

The correlation module 337 is generally configured to assess the relative cultural correlation between a candidate and an entity. The correlation module 337 assesses the relative cultural correlation between a candidate and entity by applying a mathematical algorithmic correlation function for the responses recorded for a given candidate via candidate evaluation module 331 (and stored in candidate data module 351) and the equivalent assessed response for a given entity via entity analytics module 338 (and stored in entity data module 352). The nature of the mathematical algorithmic correlation function applied may vary per response and will be retrieved via correlation data module 353. For example, in a non-limiting embodiment, algorithmic correlation for a given response may be assessed as a linear or non-linear function of relative computed distance between a given candidate's response and the value associated with a given entity's cultural profile. As another example, in a non-limiting embodiment, algorithmic correlation for a given response may be assessed on the syntactic and sentiment deviation of a candidate's response relative to the ascertained result associated with a given entity's profile. The correlation module will in turn apply another mathematical operation to the total set of cultural correlation results to determine an overall cultural correlation result between a given candidate and entity. Weighting factors can be assigned per response and can be modified algorithmically via a variety of methods and algorithms in the art including methods associated with neural networking, expert systems, and inference engines as well as methods and algorithms practiced in information theory and computer science based on algebraic operations as maintained by correlation data module 353. In a non-limiting embodiment, the cultural correlation module 337 may utilize weighing factors explicitly provided by entities and maintained by entity data module 352. In another non-limiting embodiment, the correlation module 337 may adjust weighting factors based on the variance of responses from employee's retrieved via entity analytics module 338 as modified by an entity's categorization of a given sub-set of employees as exhibiting positive cultural attributes (relative to the expectations of the entity). Culture correlation results used by culture determination engine 190 for a given candidate and entity is maintained and accessed via correlation data module 353 module of data layer 350. The correlation module 337 also determines selected statistical information as maintained by correlation data module 353 in connection with the utilization of cultural determination engine 190. For example, the number of interactions between a candidate and entity in connection with the assessment of a given cultural correlation result. The correlation module 337 may monitor statistical information that is not directly associated with a cultural correlation assessment. For example, the number of times a candidate has viewed a given entity's profile or whether a given candidate has deselected a given entity from further consideration. The associated statistical information may be used by cultural determination engine 190 to highlight or suggest entities that are relevant to a candidate. Upon reaching threshold limits, the correlation module 337 may invoke the communications module 339 to notify a candidate of cultural determination engine 190 to encourage further utilization of cultural determination engine 190. The correlation module 337 can synthesize a summary of relevant statistical information which can be displayed on a computing device 150 (e.g. via a web browser (e.g. via the presentation of counters and/or associated 'badges') or directed to a designated application or service (e.g. via an e-mail address via E-Mail Server 140) that can be accessed via computing device 150. The operation of correlation module 337 is configurable (e.g. the threshold limits associated with a given counter, the message to be conveyed to a user of correlation module 337, and any other actions in connection with reaching a threshold limit). In a non-limiting embodiment, the cultural correlation module 337 can be optionally explicitly invoked by either a candidate or entity if a candidate's or entity's cultural profile is reassessed or modified. In another non-limiting embodiment, the cultural correlation module 337 may be autonomously invoked by cultural determination engine 190 if a candidate's or entity's cultural profile is reassessed or modified.

The entity analytics module 338 is generally configured to assess an entity's cultural profile. The entity analytics module formulates an entity's cultural profile by using candidate evaluation module 331 for one or more employees associated with the entity and formulating a composite entity profile on the basis of the employees' cultural preferences. A number of methods can be used to determine a composite cultural profile including an arithmetic mean or average of the results ascertained via candidate evaluation module 331. The entity analytics module 338 will optionally deemphasize or emphasize responses associated with certain queries or employees. In a non-limiting embodiment, the entity may optionally explicitly categorize a selected sub-set of employee's as exhibiting positive cultural attributes (relative to the expectations of the entity). This may involve a binary flag as well as a relative gradient measure (e.g. ideal cultural fit to less ideal cultural fit) for each employee selected for the cultural assessment. The entity's cultural profile used by culture determination engine 190 is maintained and accessed via entity data module 352 of data layer 350. In a non-limiting embodiment, the entity analytics module 338 may undertake various statistical analyses including, but not limited to, assessing the entity's cultural profile among various demographic categories. For example, seniority (years employed by the entity), experience (years employed in a given industry), and functional role (e.g. development, marketing, finance etc.).

The communications module 339 is generally configured to maintain and effect messages between users of culture determination engine 190 or autonomously generate notifications by modules of culture determination engine 190 (e.g. messages or notifications associated with the relative correlation of a candidate and a given entity as well as messages or notifications between candidates and entities). The communications module 339 may communicate messages and notifications so that they can be accessed and managed from computing device 150 (e.g. via a web browser interface or via a native mobile application). The communications module 339 may optionally communicate messages and notifications via services and applications hosted by Social Network Server 120, E-Mail Server 140, Employment Network Server 170, or Messaging Server 180.

The charging module 340 is generally configured to determine and apply the applicable charge in connection with the use of culture determination engine 190. In a non-limiting embodiment, the charging module 340 facilitates charging in connection with a given event invoked by a candidate or entity, on the basis of a chronological period, or pursuant to an algorithmic determination. The associated rates and charges are configurable and may include a charge per event, grouping of events, once a threshold of events is reached over a given period, over a given chronological period, or for the invocation of an optional capability for using one or more aspects of cultural determination engine 190. The charging module 340 may apply the charge to a given candidate or entity via a service or application hosted via Payment Gateway Server 160. Certain aspects of the operation of charging module 340 are configurable by operational parameters provided by the candidate via candidate profile management module 332 and entity profile management module 335 (e.g. identity and credential information associated with a given payment account).

Although the above-mentioned modules are described individually, it is to be contemplated that the functionality of any given selection of modules, or of all modules, can be combined within logic layer 330.

Data layer 350 is generally configured to manage the storage of candidate, entity, or cultural correlation data associated with cultural determination engine 190. Data stored and maintained by candidate data module 351 can comprise candidate profile data managed by candidate profile management module 332 and can include log-in credentials, profile information, preferred location(s) of the candidate, leadership preferences, preferred entity information (e.g. desired size of the entity), domains of interest (preferred domains for a candidate of cultural determination engine 190 which may be used to facilitate matching by correlation module 337 (e.g. "education", "health", "finance", "marketing", "business development"), and stated cultural preferences. Data stored and maintained by entity data module 352 can comprise entity profile data managed by entity profile management module 335 and can include profile information, identities associated with employees selected for the purpose of determining the entity's cultural profile, products and services associated with the entity, job descriptions, one or more locations associated with the entity, benefit information (e.g. health plans, subsidized meals, stock-option plans, training), environmental conditions (e.g. office topology, type of office furniture and equipment used), payment information, cultural hypotheses specific to the entity, and size of the entity in terms of the number of employee's employed. Data stored and maintained by correlation data module 353 can comprise correlation data including culture correlation results for a given candidate and entity as determined my cultural correlation module 337 as well as statistical information associated with cultural determination engine 190. Data stored and maintained by assessment data module 354 can comprise assessment data including assessment queries used by candidate evaluation module 331.

Figure 4:
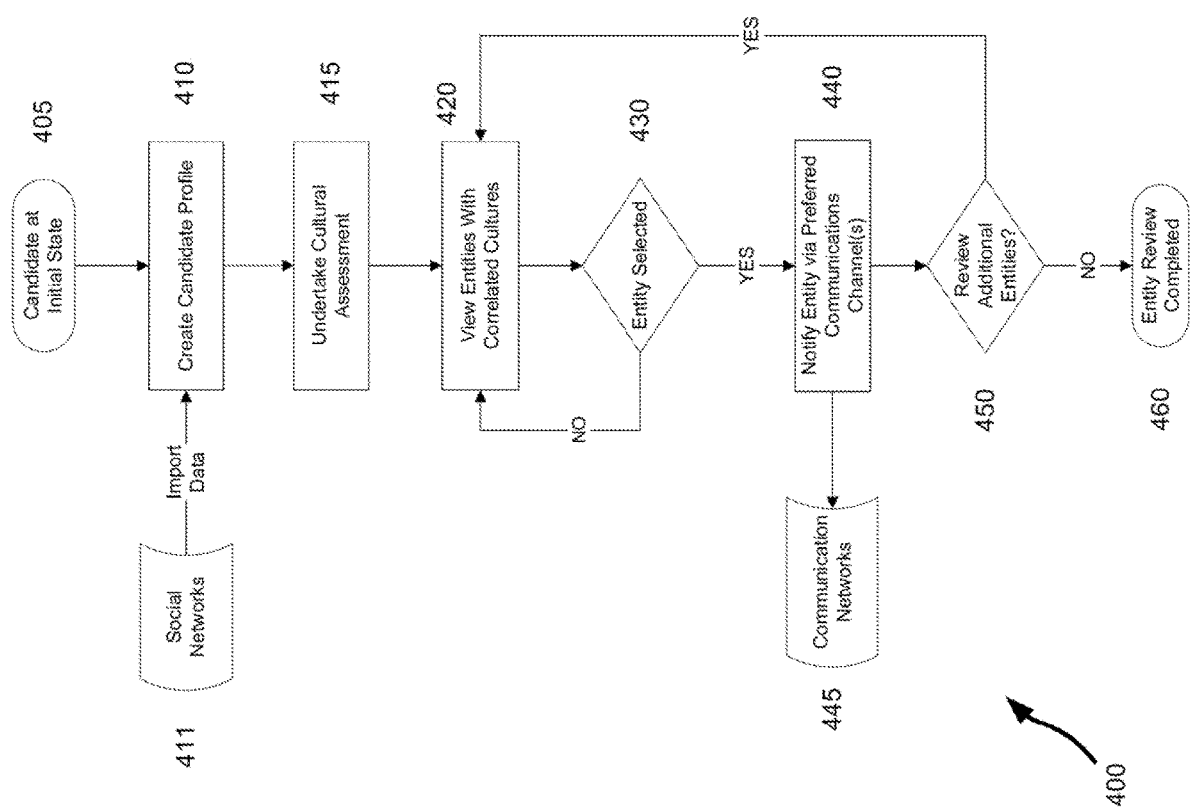
FIG. 4 is a flow chart of a method in accordance with an embodiment of determining the cultural assessment for a candidate and correlating it with cultural assessments associated with one or more entities.

Referring now to FIG. 4, a method 400 of determining the cultural assessment for a candidate and correlating it with cultural assessments associated with one or more entities will be described in conjunction with its performance in system 100. It will be appreciated, however, that method 400 need not be performed exactly as discussed herein. For example, the individual blocks can be performed in different sequences for the purpose of updating candidate or entity data or determining the applicable cultural determination or cultural correlation. In addition, it will be appreciated that method 400 can be performed in systems other than system 100. It will be evident that any combination of web-browser applications, native applications, hybrid-applications, or 'web widgets' hosted by computing device 150 may be used to facilitate the entry or modification of data for method 400.

Beginning at 405, a candidate of cultural determination engine 190 is at an initial state whereby the candidate has not undertaken a cultural assessment or been correlated with one or more entities.

At block 410, a candidate of cultural determination engine 190 creates a profile. In a non-limiting embodiment, the culture determination engine 190 may receive input via the API layer 310 requesting the creation of a profile. The profile may include credentials for cultural determination engine 190 as well as applications and services hosted by servers or computing devices 150 accessible via network 110. The profile may also include descriptive information pertaining to the user of cultural determination engine 190 (e.g. the user's picture and other descriptive information). Other personal and contextual information may be supplied by the user for the purpose of creating a profile, including but not limited to existing and preferred locations, preferred domains of interest, and preferred entity size. The candidate profile including identity and other data associated with a given user's social graph may be supplemented or augmented via data imported via Social Networks 411 hosted on Social Network Server 120. A variety of methods may be used to access and retrieve information from services and applications hosted via Social Network Server 120 including but not limited to the use of an API provided by a given service and application as well as 'web scraping'. Web scraping is the process of automatically collecting information from the World Wide Web. It is a field with active developments sharing a common goal with the semantic web vision, an ambitious initiative that still requires breakthroughs in text processing, semantic understanding, artificial intelligence, and human-computer interactions. Current web scraping solutions range from the ad-hoc, requiring human effort, to fully automated systems that are able to convert entire web sites into structured information, with limitations. There are many software tools available that can be used to customize web-scraping solutions. This software may attempt to automatically recognize the data structure of a page or provide a recording interface that removes the necessity to manually write web-scraping code, or some scripting functions that can be used to extract and transform content, and database interfaces that can store the scraped data in local databases. At block 415, the candidate undertakes a cultural assessment using computational device 150 in conjunction with cultural determination engine 190. The candidate's cultural preferences are evaluated via a number of responses to queries or hypotheses displayed and recorded via a computational device 150 accessed via network 110. Queries to the candidate can be formulated via a variety of methods including a gradient between two conceptual opposites (e.g. "Not at all" to "Always"), multiple choice questions, binary responses to a hypothesis or scenario (e.g. 'True' or 'False'), or a question where the candidate can provide a free form response by text or by voice. The sequence, number, and nature of the queries can be modified based on a variety of factors including contextual factors (e.g. the candidate's location, the nature of the computational device used) as well as the candidate's preferences (e.g. preferred language, domains of interest). For example, the nature and number of hypothesis submitted to a candidate may vary as a function of the unique cultural attributes associated with a given location (e.g. San Francisco, United States vs. Berlin, Germany) associated with a given entity. As another example, the means by which a hypothesis is conveyed to a candidate may vary if the computational is not capable of rendering a hypothesis in a suitable manner (e.g. a computational device 150 that has limited graphical display capabilities). In this scenario, a non-limiting embodiment of the invention may provide the hypothesis by means of text-to-speech synthesis and accept a response by means of speech-to-text recognition. In a non-limiting embodiment, a given entity can optionally supply a finite set of incremental hypotheses to complement a base-line set of hypothesis supplied by the cultural determination engine. Optional entity specific hypothesis are retrieved via the entity data module 353 of data layer 350.

At block 420, the cultural determination engine 190 determines which entities are culturally correlated to a given candidate. Cultural determination engine 190 assesses the relative cultural correlation between a candidate and entity by applying a mathematical algorithmic correlation function for the responses recorded for a given candidate and the equivalent assessed response for a given entity. The nature of the mathematical correlation function applied may vary per response. Cultural determination engine 190 will in turn apply another mathematical operation to the total set of cultural correlation results to determine an overall cultural correlation result between a given candidate and entity. Weighting factors can be assigned per response and modified via a variety of methods and algorithms in the art including methods associated with neural networking, expert systems, and inference engines as well as methods and algorithms practiced in information theory and computer science based on algebraic operations. Cultural determination engine 190 displays entities that are determined to be culturally correlated with the candidate via computing device 150 (e.g. via a native application, hybrid application, or web browser). The cultural determination engine 190 may optionally send a notification message directed to a designated application or service (e.g. via an e-mail address via E-Mail Server 140 or via a messaging identifier via Messaging Server 180) that can accessed via communications device 150 so that the candidate can be made aware of entities that are culturally correlated to the candidate. In an non-limiting embodiment of the cultural determination engine 190, the cultural determination engine 190 may optionally supply supplementary information or media associated with a given entity such as written or video testimonials from employee's that are associated with the entity. In another non-limiting embodiment of the cultural determination engine 190, the cultural determination engine 190 may optionally supply social media linkages between the given candidate and employee's associated with the entity as supplied via social network integration module 333.

At block 430, the candidate interacts with cultural determination engine 190 via computing device 150 for the purpose of selecting or rejecting an entity which has previously determined to be culturally correlated with the candidate. The candidate can specifically indicate the selection or rejection of a proposed entity in conjunction with a web-browser application, native application, hybrid application, or 'web widget' supported by computing device 150. If the candidate does not select the entity, then the method proceeds back to block 420 so that the cultural determination engine can select additional entities that are culturally correlated with the candidate. If the candidate selects an entity, then the method proceeds to block 440.

At block 440, the cultural determination engine 190 notifies the selected entity via the entity's preferred communication networks 445 that a candidate has indicated interest in the entity. A variety of methods may be used to communicate a candidate's interest for a given entity including notifications via web-browser applications, native applications, hybrid applications, or 'web widgets' hosted by computing devices 150 associated with the entity. For example, the cultural determination engine 190 may send a notification message of a candidate's interest to a designated application or service (e.g. via an e-mail address via E-Mail Server 140 or via a messaging identifier via Messaging Server 180 or via an employment network application via Human Resource Systems Server 130) that can be accessed via communications device 150. In a non-limiting embodiment, the cultural determination engine 190 can also communicate the linkages between a given candidate and the entity's employees via data retrieved via social network integration module 333. For example, the direct linkages between a given candidate and employees of the entity via social network applications such as TWITTER, FACEBOOK, or LINKEDIN. Those skilled in the art will recognize that a given entity can utilize supplied social linkage information in subsequent communications with a given candidate. In another non-limiting embodiment, the cultural determination engine 190 can provide the entity with a summary of a given candidate's social activity retrieved via social network integration module 333. Social activity may be used to complement the cultural correlation function as provided by cultural determination engine 190. In another non-limiting embodiment of the cultural determination engine 190, the cultural determination engine 190 may optionally supply social media linkages between the given candidate and employee's associated with the entity as supplied via social network integration module 333.

At block 450, the culture determination engine 190 determines if there are additional entities that are culturally correlated with the candidate. If there are additional entities that are culturally correlated with the candidate then the method proceeds to block 420. If there are no additional entities that are culturally correlated with the candidate then the method concludes at block 460.

Figure 5:
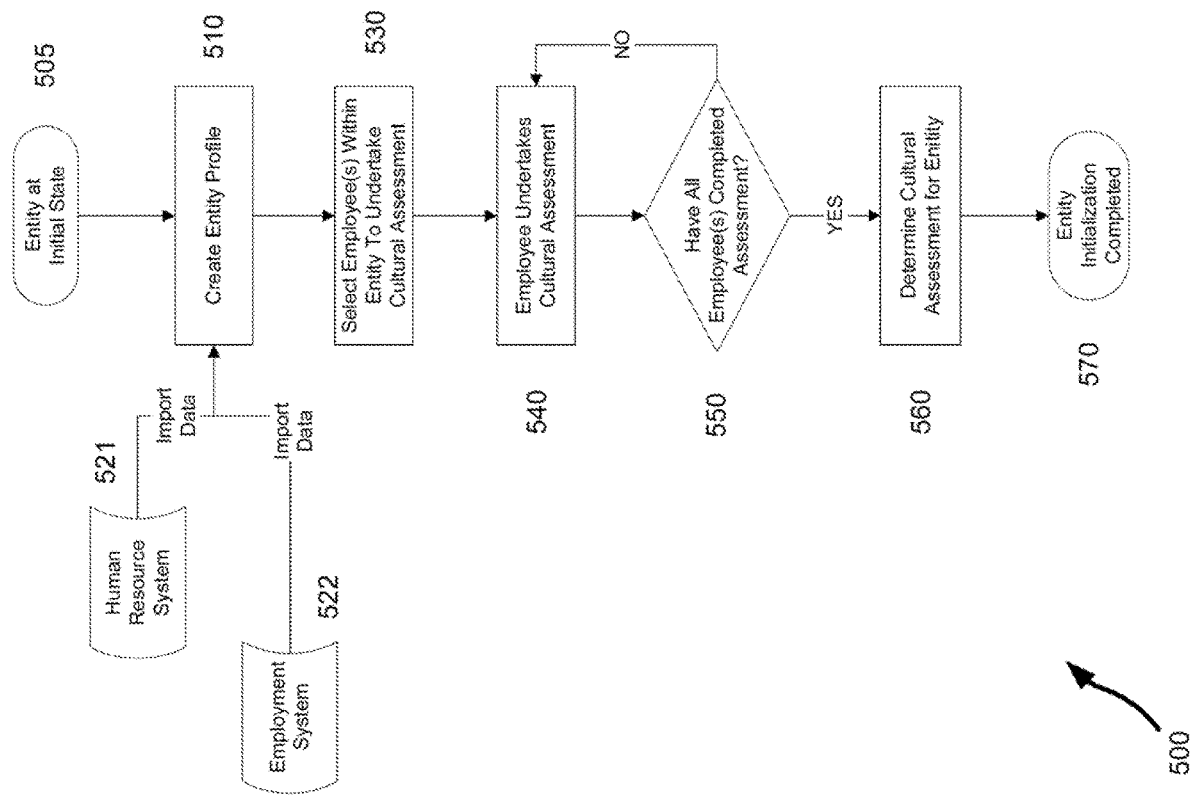
FIG. 5 is a flow chart of a method in accordance with an embodiment of determining the cultural assessment for an entity.

Referring now to FIG. 5, a method 500 of determining the cultural assessment for an entity will be described in conjunction with its performance in system 100. It will be appreciated, however, that method 500 need not be performed exactly as discussed herein. For example, the individual blocks can be performed in different sequences for the purpose of determining the cultural assessment for a given entity. In addition, it will be appreciated that method 500 can be performed in systems other than system 100. It will be evident that any combination of web-browser applications, native applications, hybrid-applications, or 'web widgets' hosted by computing device 150 may be used to facilitate the entry or modification of data or the execution for method 500.

Beginning at 505, an entity of cultural determination engine 190 is at an initial state whereby the entity has not determined its cultural assessment.

At block 510, an entity of cultural determination engine 190 creates a profile. In a non-limiting embodiment, the culture determination engine 190 may receive input via the API layer 310 requesting the creation of a profile. The profile may include credentials for cultural determination engine 190 as well as applications and services hosted by servers or computing devices 150 accessible via network 110. The profile data maintained by cultural determination engine 190 includes, but is not limited to, log-in credentials, profile information, identities associated with employees selected for the purpose of determining the entity's cultural profile, products and services associated with the entity, job descriptions, one or more locations associated with the entity, benefit information (e.g. health plans, subsidized meals, stock-option plans, training), environmental conditions (e.g. office topology, type of office furniture and equipment used), size of the entity, and other contextual data such as the current location and the nature of the computational device used by an authorized user associated with entity of cultural determination engine 190. The data maintained by cultural determination engine 190 also includes, but is not limited to, one or more account identifiers, payment information and credentials, cultural hypotheses specific to the entity, log-in names or other credentials and information to access, send, or retrieve data from applications and services hosted by servers accessible via network 110. The entity's profile including identity and other data associated with a given entity may be supplemented or augmented via data imported via Human Resource Systems 521 hosted on Human Resource Systems Servers 130 and Employment Systems 522 hosted on Employment Network Servers 170. Those skilled in the art will recognize that a variety of methods may be used to access and retrieve information from services and applications hosted via Human Resource Systems Servers 130 and Employment Network Servers 170 including but not limited to the use of an API provided by a given service and application as well as 'web scraping'. The profile data acquired at block 510 may also include attributes associated with facilitating access (e.g. e-mail addresses, LINKEDIN identifiers etc.) to facilitate communication to users of cultural determination engine 190 via E-Mail Server 140, Employment Network Server 170, Messaging Server 180, or Social Network Server 120 accessible via network 110.

At block 530, an entity of cultural determination engine 190 selects employee(s) within the entity to undertake a cultural assessment. The entity will specifically select one or more employee(s) that represent the culture associated with the entity. In a non-limiting embodiment, the entity may optionally explicitly categorize a selected sub-set of employee(s) as exhibiting positive cultural attributes (relative to the expectations of the entity). This may involve a binary flag as well as a relative gradient measure (e.g. ideal cultural fit to less ideal cultural fit) for each employee selected for the cultural assessment. The entity will provide the applicable identifiers (e.g. names, e-mail addresses) to cultural determination engine 190.

At block 540, an employee selected at block 530 will undertake the cultural assessment associated with block 415 of FIG. 4 or method 600.

At block 550, the method will determine if the requisite number of employee(s) have undertaken the cultural assessment per block 540. If the requisite number of employee(s) have undertaken the cultural assessment, then the method proceeds to block 560. If the requisite number of employee (s) have not undertaken the cultural assessment, then the method proceeds to block 540.

At block 560, the cultural determination engine 190 determines the cultural profile for an entity. The cultural determination engine 190 formulates an entity's cultural profile by determining a composite entity profile on the basis of the employees' cultural preferences. A number of methods can be used to determine a composite cultural profile including a weighted arithmetic mean or average of the results ascertained via cultural determination engine 190 (at block 415). Weighting factors can be assigned per response and modified via a variety of methods and algorithms in the art including methods associated with neural networking, expert systems, and inference engines as well as methods and algorithms practiced in information theory and computer science based on algebraic operations as maintained by cultural determination engine 190.

The method concludes at block 570 with the determination of cultural profile for the entity. The cultural profile can be optimized from time to time by re-invoking the method 500 or by augmenting a pre-existing entity profile by assessing cultural preferences from additional employees via method 500.

Figure 6:
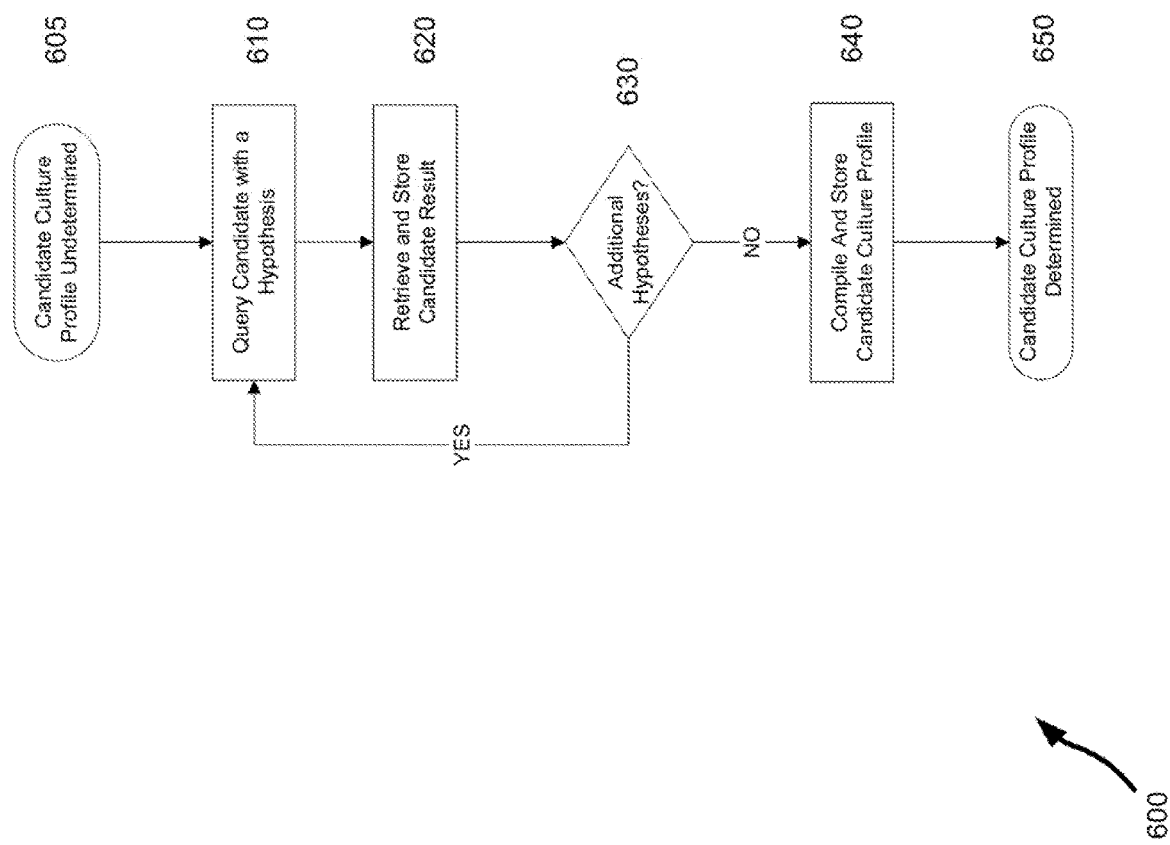
FIG. 6 is a flow chart of a method in accordance with an embodiment of determining the cultural profile for a candidate.

Referring now to FIG. 6, a method 600 of determining the cultural profile for a candidate will be described in conjunction with its performance in system 100. FIG. 6 expands upon the method described as block 415 associated with FIG. 4. It will be appreciated, however, that method 600 need not be performed exactly as discussed herein. For example, the individual blocks can be performed in different sequences for the purpose of determining the cultural assessment for a given entity. In addition, it will be appreciated that method 600 can be performed in systems other than system 100. It will be evident that any combination of web-browser applications, native applications, hybrid-applications, or 'web widgets' hosted by computing device 150 may be used to facilitate the entry or modification of data or the execution for method 600.

At block 605, the candidate's cultural profile is undetermined.

At block 610, the candidate is provided with a query or hypothesis retrieved via the assessment data module 354 of data layer 350 via candidate evaluation module 331 and displayed via a computational device 150 accessed via network 110. Queries or hypotheses can be formulated via a variety of methods including a gradient between two conceptual opposites (e.g. "Not at all" to "Always"), multiple choice questions, or a question where the candidate can provide a free form response by text or by voice. In a non-limiting embodiment, a given entity can optionally supply a finite set of incremental hypotheses to complement a base-line set of hypothesis supplied by the cultural determination engine. Optional entity specific hypothesis are retrieved via the entity data module 353 of data layer 350.

At block 620, the candidate provides a response to the query or hypothesis via a computational device 150 accessed via network 110 that is stored by cultural determination engine 190.

At block 630, the cultural determination engine 190 determines if additional queries or hypotheses are required for the candidate. The sequence, number, and nature of the queries can be modified based on a variety of factors including contextual factors (e.g. the candidate's location, the nature of the computational device used) as well as the candidate's preferences (e.g. preferred language, domains of interest). If no additional queries or hypotheses are required then the method proceeds to block 640. If additional queries and hypotheses are required, then the method proceeds to block 610.

At block 640, the candidate's responses are modified by weighting factors. Weighting factors can be assigned per response and modified via a variety of methods and algorithms in the art including methods associated with neural networking, expert systems, and inference engines as well as methods and algorithms practiced in information theory and computer science based on algebraic operations as maintained by cultural determination engine 190. The candidate's weighted responses are stored by cultural determination engine as the candidate's cultural profile. The method concludes at block 650.

Figure 7:
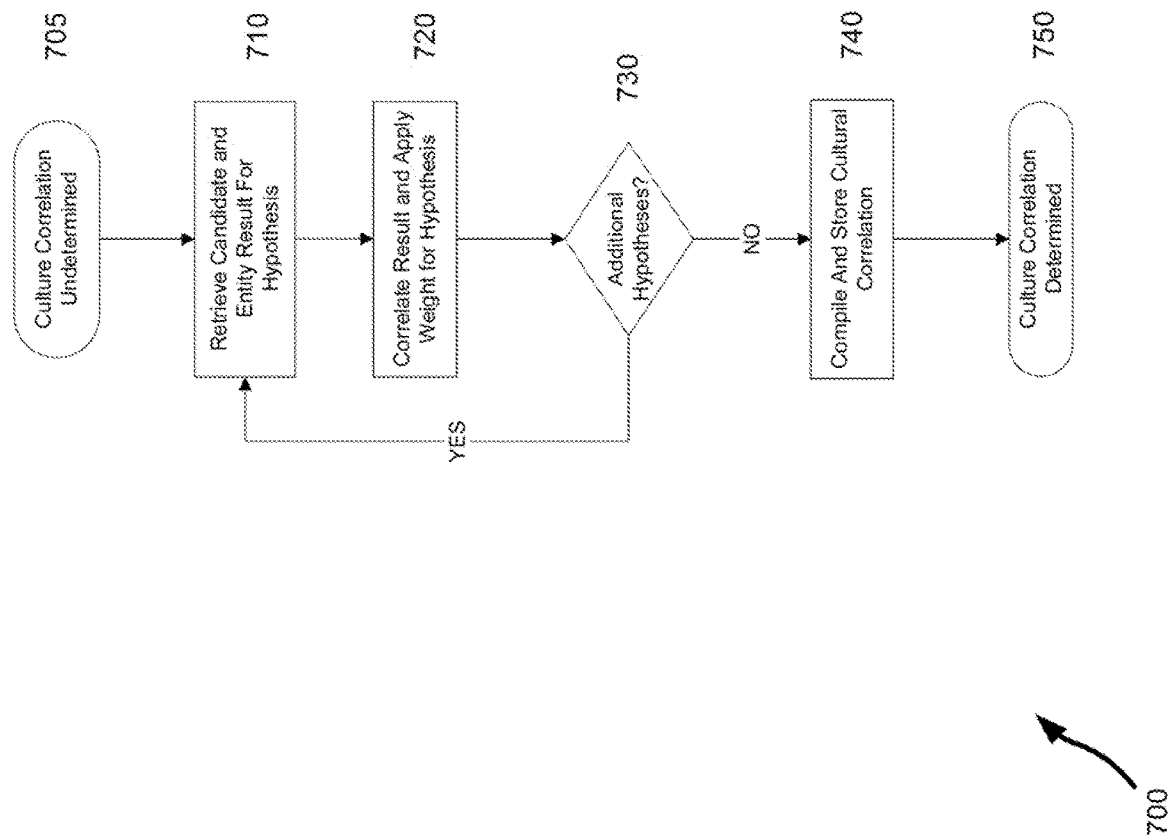
FIG. 7 is a flow chart of a method in accordance with an embodiment of determining the cultural correlation between a candidate and an entity.

Referring now to FIG. 7, a method 700 of determining the cultural correlation between a candidate and an entity will be described in conjunction with its performance in system 100. FIG. 7 expands upon the method described as block 420 associated with FIG. 4. It will be appreciated, however, that method 700 need not be performed exactly as discussed herein. For example, the individual blocks can be performed in different sequences for the purpose of determining the cultural assessment for a given entity. In addition, it will be appreciated that method 700 can be performed in systems other than system 100. It will be evident that any combination of web-browser applications, native applications, hybrid-applications, or 'web widgets' hosted by computing device 150 may be used to facilitate the entry or modification of data or the execution for method 700.

At block 705, the cultural correlation between a candidate and an entity is undetermined.

At block 710, the cultural profile for a candidate and the cultural assessment for an entity are retrieved by cultural determination engine 190.

At block 720, the cultural determination engine computes the relative cultural correlation between a candidate and entity by applying a mathematical algorithmic correlation function for a given response recorded for a given candidate and the equivalent assessed response for a given entity. The nature of the mathematical algorithmic correlation function applied may vary per response. The cultural determination engine 190 will in turn apply another mathematical operation to the total set of cultural correlation results to determine an overall cultural correlation result between a given candidate and entity. Weighting factors can be assigned per response and modified via a variety of methods and algorithms in the art including methods associated with neural networking, expert systems, and inference engines as well as methods and algorithms practiced in information theory and computer science based on algebraic operations as maintained cultural determination engine 190.

At block 730, the cultural determination engine 190 determines if additional queries or hypotheses are associated for the candidate. The sequence, number, and nature of the queries can be modified based on a variety of factors including contextual factors (e.g. the candidate's location, the nature of the computational device used) as well as the candidate's preferences (e.g. preferred language, domains of interest). If no additional queries or hypotheses are required then the method proceeds to block 740. If additional queries and hypotheses are required, then the method proceeds to block 710.

At block 740, the cultural determination engine compiles and stores the aggregate cultural correlation score based on the results of block 730. The method concludes at block 750.

Figure 8:
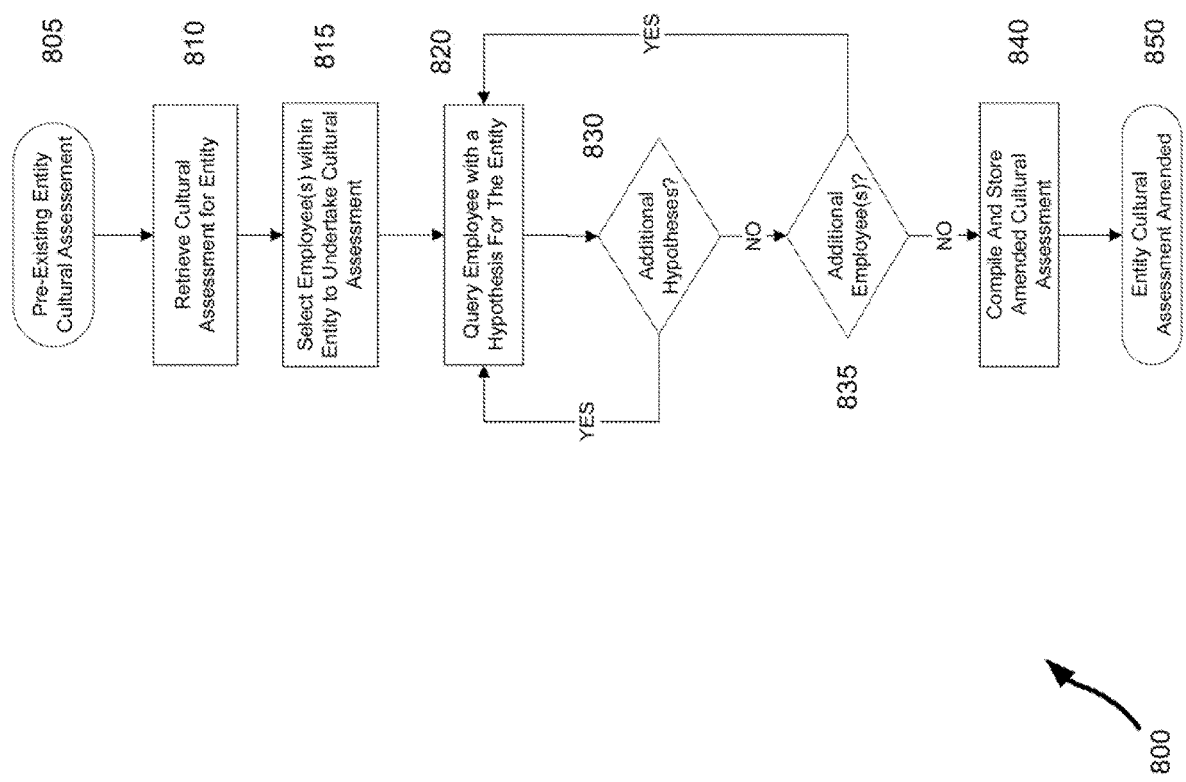
FIG. 8 is a flow chart of a method in accordance with an embodiment of amending or augmenting the cultural assessment for an entity.

Referring now to FIG. 8, a method 800 of amending or augmenting the cultural assessment for an entity will be described in conjunction with its performance in system 100. FIG. 8 expands upon the method associated with FIG. 4. It will be appreciated, however, that method 800 need not be performed exactly as discussed herein. For example, the individual blocks can be performed in different sequences for the purpose of determining the cultural assessment for a given entity. In addition, it will be appreciated that method 800 can be performed in systems other than system 100. It will be evident that any combination of web-browser applications, native applications, hybrid-applications, or 'web widgets' hosted by computing device 150 may be used to facilitate the entry or modification of data or the execution for method 800.

At block 805, an entity of cultural determination engine 190 amends or augments a pre-existing cultural assessment. There are a number of scenarios that may invoke an entity to augment its cultural profile including but not limited to a rapid growth in the number of employees, an initial cultural assessment was undertaken with a relatively low number sample employees, or the cultural hypotheses and queries associated with an given entity have been optimized for the entity in question.

At block 810, the cultural assessment for the entity is retrieved by cultural determination engine 190.

At block 815, an entity of cultural determination engine 190 selects employee(s) within the entity to undertake a cultural assessment. The entity will specifically select one or more employee(s) that represent the culture associated with the entity. In a non-limiting embodiment, the entity may optionally explicitly categorize a selected sub-set of employees as exhibiting positive cultural attributes (relative to the expectations of the entity). This may involve a binary flag as well as a relative gradient measure (e.g. ideal cultural fit to less ideal cultural fit) for each employee selected for the cultural assessment. The entity will provide the applicable identifiers (e.g. names, e-mail addresses) to cultural determination engine 190.

At block 820, the employee is provided with a query or hypothesis retrieved via the assessment data module 354 of data layer 350 via candidate evaluation module 331 and displayed via a computational device 150 accessed via network 110. Queries or hypotheses can be formulated via a variety of methods including a gradient between two conceptual opposites (e.g. "Not at all" to "Always"), multiple choice questions, or a question where the candidate can provide a free form response by text or by voice. In a non-limiting embodiment, a given entity can optionally supply a finite set of incremental hypotheses to complement a base-line set of hypothesis supplied by the cultural determination engine. Optional entity specific hypothesis are retrieved via the entity data module 353 of data layer 350. The employee provides a response to the query or hypothesis via a computational device 150 accessed via network 110 that is stored by cultural determination engine 190.

At block 830, the cultural determination engine 190 determines if additional queries or hypotheses are required for the employee. The sequence, number, and nature of the queries can be modified based on a variety of factors including contextual factors (e.g. the employee's location, the nature of the computational device used). If no additional queries or hypotheses are required then the method proceeds to block 840. If additional queries and hypotheses are required, then the method proceeds to block 820.

At block 835, the method will determine if the requisite number of employee(s) have undertaken the cultural assessment. If the requisite number of employee(s) have undertaken the cultural assessment, then the method proceeds to block 840. If the requisite number of employee(s) have not undertaken the cultural assessment, then the method proceeds to block 820.

At block 840, the cultural determination engine 190 determines the amended cultural assessment for an entity. The cultural determination engine 190 formulates an entity's cultural profile by determining a composite entity profile on the basis of the employees' cultural preferences as well as the previously retrieved cultural assessment at block 810. A number of methods can be used to determine a composite cultural profile including an arithmetic mean or weighted average of the results ascertained via cultural determination engine 190. The method concludes at block 850.

Figure 9:
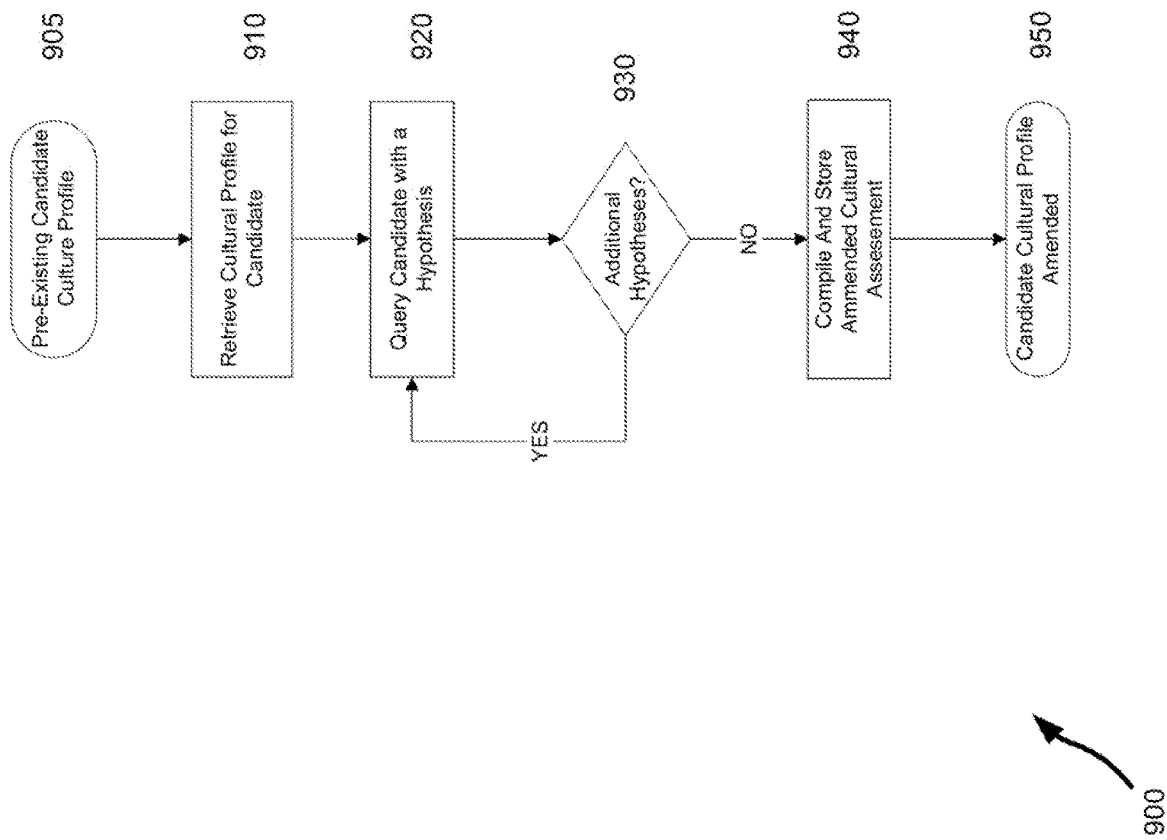
FIG. 9 is a flow chart of a method in accordance with an embodiment of reassessing the cultural profile for a candidate.

Referring now to FIG. 9, a method 900 of reassessing the cultural profile for a candidate will be described in conjunction with its performance in system 100. FIG. 9 expands upon the method 400 associated with FIG. 4. It will be appreciated, however, that method 900 need not be performed exactly as discussed herein. For example, the individual blocks can be performed in different sequences for the purpose of determining the cultural assessment for a given entity. In addition, it will be appreciated that method 900 can be performed in systems other than system 100. It will be evident that any combination of web-browser applications, native applications, hybrid-applications, or 'web widgets' hosted by computing device 150 may be used to facilitate the entry or modification of data or the execution for method 900.

At block 905, the candidate's cultural profile needs to be reassessed (e.g. upon the explicit request of the candidate or as determined algorithmically by cultural determination engine 190).

At block 910, the cultural profile for the candidate is retrieved by cultural determination engine 190.

At block 920, the candidate is provided with a query or hypothesis retrieved via the assessment data module 354 of data layer 350 via candidate evaluation module 331 and displayed via a computational device 150 accessed via network 110. Queries or hypotheses can be formulated via a variety of methods including a gradient between two conceptual opposites (e.g. "Not at all" to "Always"), multiple choice questions, or a question where the candidate can provide a free form response by text or by voice. In a non-limiting embodiment, a given entity can optionally supply a finite set of incremental hypotheses to complement a base-line set of hypothesis supplied by the cultural determination engine. Optional entity specific hypothesis are retrieved via the entity data module 353 of data layer 350. The candidate provides a response to the query or hypothesis via a computational device 150 accessed via network 110 that is stored by cultural determination engine 190.

At block 930, the cultural determination engine 190 determines if additional queries or hypotheses are required for the candidate. The sequence, number, and nature of the queries can be modified based on a variety of factors including contextual factors (e.g. the candidate's location, the nature of the computational device used) as well as the candidate's preferences (e.g. preferred language, domains of interest). If no additional queries or hypotheses are required then the method proceeds to block 940. If additional queries and hypotheses are required, then the method proceeds to block 920.

At block 940, the candidate's responses are modified by weighting factors. Weighting factors can be assigned per response and modified via a variety of methods and algorithms in the art including methods associated with neural networking, expert systems, and inference engines as well as methods and algorithms practiced in information theory and computer science based on algebraic operations as maintained by cultural determination engine 190. The candidate's weighted responses are stored by cultural determination engine as the candidate's cultural profile. The method concludes at block 950.

Referring now to FIG. 10, a method 1000 of reassessing the cultural profile for a candidate will be described in conjunction with its performance in system 100. FIG. 10 expands upon the method 400 associated with FIG. 4. It will be appreciated, however, that method 1000 need not be performed exactly as discussed herein. For example, the individual blocks can be performed in different sequences for the purpose of determining the cultural assessment for a given entity. In addition, it will be appreciated that method 1000 can be performed in systems other than system 100. It will be evident that any combination of web-browser applications, native applications, hybrid-applications, or 'web widgets' hosted by computing device 150 may be used to facilitate the entry or modification of data or the execution for method 1000.

At block 1005, a pre-existing entity's cultural assessment needs to be reassessed (e.g. upon the explicit request of the entity (or authorized agent of the entity) or as determined algorithmically by cultural determination engine 190).

At block 1010, the cultural assessment for the entity is retrieved by cultural determination engine 190.

At block 1020, the cultural determination engine 190 retrieves the cultural profiles of candidates that selected and de-selected the entity pursuant to method 400.

At block 1030, the cultural determination engine 190 determines if a modification to the cultural assessment of the entity is required based on the cultural profiles of candidates that selected and de-selected the entity pursuant to method 400. A variety of methods and algorithms in the art can be used to amend the cultural profile of the entity including methods associated with neural networking, expert systems, and inference engines as well as methods and algorithms practiced in information theory and computer science based on algebraic operations as maintained by cultural determination engine 190.

At block 1040, the cultural determination engine compiles and stores the emended cultural assessment based on the results of block 1030. The method concludes at block 1050.

It is to be understood that the foregoing present certain exemplary embodiments, but modifications, variations, subsets and/or combinations thereof are to be contemplated. For example, it is to be understood that system 100, cultural determination engine 190 and methods 400, 500, 600, 700, 800, 900, and 1000 may be modified to also support the determination of the cultural profile of a candidate, the cultural assessment of an entity, and the cultural correlation between a candidate and an entity in conjunction with an applicant tracking mechanism associated with Human Resource Systems Server 130. In the latter embodiment, the applicant tracking mechanism associated with Human Resource Systems Server 130 will invoke cultural determination engine 190 for the purpose determining the cultural profile of a candidate and the cultural correlation between a candidate and an entity.

In some embodiments, the resources (e.g. memory and processor) and functionality of servers and cultural determination engine 190 may be partially or entirely distributed via one or more computing devices or servers in a construct known as a 'cloud' or 'cloud computing'. Cloud computing relies on sharing of resources to achieve coherence and economies of scale, similar to a utility (like the electricity grid) over a network. At the foundation of cloud computing is the broader concept of converged infrastructure and shared services. Cloud computing, or in simpler shorthand just "the cloud", also focuses on maximizing the effectiveness of the shared resources. Cloud resources are usually not only shared by multiple users but are also dynamically reallocated per demand. This can work for allocating resources to users. This approach should maximize the use of computing power thus reducing environmental damage as well since less power, air conditioning, rack space, etc. are required for a variety of functions. With cloud computing, multiple users can access a single server to retrieve and update their data without purchasing licenses for different applications. For example, with reference to method 400, resources can be distributed among several computing devices and servers with processing of method 400 being coordinated by methods and algorithms well known by those skilled in the art. It is also to be contemplated that in some embodiments, that servers and associated applications may be provided via cloud computing methods and practices. Persons skilled in the art will appreciate that there are yet more alternative implementations and modifications possible for implementing the embodiments, and that the above implementations and examples are only illustrations of one or more embodiments.

While specific embodiments have been described and illustrated, such embodiments should be considered illustrative only and should not serve to limit the accompanying claims.

What is claimed is:

1. An apparatus comprising:
a network interface connected to a network, wherein the network interface is configured to receive candidate data from a plurality of computing devices and a plurality of external servers;
a memory storage unit to store the candidate data from the plurality of computing devices and the plurality of external servers;
a communications module connected to the network interface;
a processor connected to the network interface and the memory storage unit, the processor comprising:
a candidate evaluation module configured to obtain candidate data by creating a plurality of queries to be sent via the network interface to the plurality of computing devices and the plurality of servers; and
a correlation module configured to automatically compare and correlate the candidate data obtained by the candidate evaluation module with an entity's cultural data with weighting factors, and compute a cultural correlation score; and
wherein the processor is configured to automatically send a notification via the communications module to provide the cultural correlation score of a candidate to the entity to aid the entity in making a hiring decision.

2. The apparatus of claim 1, wherein the plurality of queries are multiple choice questions.

3. The apparatus of claim 1, wherein the plurality of queries are free-form questions.

4. The apparatus of claim 1, wherein the candidate evaluation module generates the entity's cultural data based on cultural assessment data.

5. The apparatus of claim 4, wherein the cultural assessment data is collected from employees of an entity.

6. The apparatus of claim 5, wherein the entity's cultural data is generated based on the cultural assessment data from a threshold number of the employees.

7. A method of operating a cultural determination engine, the method comprising:

creating a plurality of queries to be sent to a plurality of computing devices via a network interface using a candidate evaluation module;

receiving candidate data via a network interface from the plurality of computing devices and a plurality of external servers using the candidate evaluation module;

storing the candidate data from the plurality of computing devices and the plurality of external servers in a memory storage unit;

automatically comparing and correlating the candidate data obtained by the candidate evaluation model with an entity's cultural data with weighting factors, and computing a cultural correlation score via a correlation module;

sending a notification via a communications module to provide the cultural correlation score of a candidate to the entity to aid the entity in making a hiding decision.

8. The method of claim 7, wherein the plurality of queries are multiple choice questions.

9. The method of claim 7, wherein the plurality of queries are free-form questions.

10. The method of claim 7, further comprising collecting cultural assessment data from employees of an entity to generate the entity's cultural data.

11. The method of claim 10, wherein collecting the cultural assessment data comprises collecting the cultural assessment data from a threshold number of the employees.

12. A non-transitory machine-readable storage medium encoded with instructions executable by a processor, the non-transitory machine-readable storage medium comprising:

Instruction to create a plurality of queries to be sent to a plurality of computing devices via a network interface using a candidate evaluation module;

instructions to receive candidate data via a network interface from the plurality of computing devices and a plurality of external servers using the candidate evaluation module;

instructions to store the candidate data from the plurality of computing devices and the plurality of external servers in a memory storage unit;

instruction to automatically compare and correlate the candidate data obtained by the candidate evaluation module with an entity's cultural data with weighting factors, and to compute a cultural correlation score via a correlation module;

instructions to send a notification via a communications module to provide the cultural correlation score of a candidate to the entity to aid the entity in making a firing decision.

13. The non-transitory machine-readable storage medium of claim 12, further comprising instructions to collect cultural assessment data from employees of an entity to generate the entity's cultural data.

14. The non-transitory machine-readable storage medium of claim 13, wherein instructions to collect the cultural assessment data comprises instructions to collect the cultural assessment data from a threshold number of the employees.

* * * * *